Dec. 17, 1935.   F. M. ROESCH   2,024,390
TAPPING APPARATUS
Filed Jan. 19, 1933
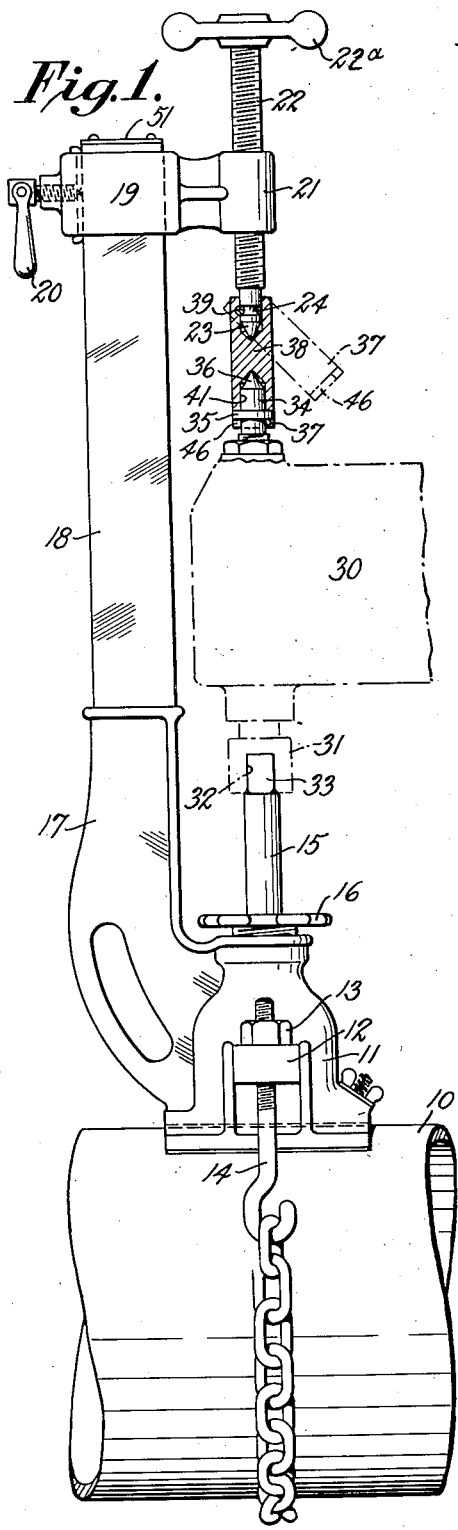
INVENTOR
Fred Michael Roesch
BY
Wm. T. Hedlund
his ATTORNEY Patented Dec. 17, 1935

2,024,390

UNITED STATES PATENT OFFICE 2,024,390

TAPPING APPARATUS

Fred Michael Roesch, Hollis, N. Y.

Application January 19, 1933, Serial No. 652,558

3 Claims. (Cl. 77—14)

My invention relates to apparatus for tapping mains or pipes containing liquid or gas at different pressure than atmospheric. In particular, my invention has been developed in connection with the tapping of gas mains.

The principal object of my invention is to provide an apparatus for effectively retaining a power machine in position to drill, ream and tap a hole in a pipe. Although the word tapping relates specifically to the step of screw-threading a hole, I also use the word herein generically as including drilling and reaming operations.

The nature of my invention will become apparent from the following description taken in connection with the accompanying drawing forming a part of this specification, and of which:

Fig. 1 is an elevational view of apparatus embodying my invention;

Fig. 2 is a side view of part of a retaining and locking device forming part of my invention;

Fig. 3 is a cross-sectional view taken on the line 3—3 of Fig. 2, also showing an additional part;

Fig. 4 is a view of the lower end of the part shown in Fig. 2;

Fig. 5 is a side view of another part of the retaining and locking device;

Fig. 6 is a cross-sectional view taken on the line 6—6 of Fig. 5; and

Fig. 7 is another view of the part shown in Fig. 5.

Fig. 1 shows my improved tapping apparatus mounted on a main or pipe 10. A saddle 11 has a curved bottom adapted to rest on the pipe 10. A rubber gasket is generally interposed between the saddle 11 and the pipe 10. On each side of saddle 11 are bosses 12 on which are nuts 13 screwed onto hooks 14 which engage the ends of a chain encircling the pipe 10. By setting up on the nuts 13, the saddle 11 can be tightly clamped on the main. The gasket serves to prevent or diminish leakage between the saddle and the surface of the pipe 10 during drilling, reaming and tapping.

The saddle 11 is provided with an internal vertical bore in which is placed a tool 15. The tool 15 may be a drill or a reamer or a tap or a combination of the three. A stuffing box is provided where the tool 15 enters the saddle 11 and comprises an adjustable handle 16 for effecting tightness to prevent or diminish leakage.

The saddle 11 is provided with an extension 17 on which is mounted a vertical slide bar 18. The slide bar 18 is preferably rectangular in cross-section. Mounted on the slide bar is a holder 19. The holder 19 is movable longitudinally on the slide bar 18 and can be set in any desired position by means of a hand screw 20. An end plate 51 is removably screwed to the top of the slide bar 18 to provide a stop for holder 19 and is removable to permit ready repair or exchange of member 19 and associated parts. The holder 19 has a projection 21 which is bored and tapped to receive a feed screw member 22 having a handle 22a for moving the screw member vertically within the projection 21. The lower end of the screw member 22 is pointed as at 23, and immediately above the point is provided with a circumferential groove 24. The slide bar 18 and holder 19 are so machined that, in all working positions, they will hold screw member 22 in line with the center of tool 15.

Secured to the bottom part of the screw 22 is a retaining and locking means for holding a power machine in position. The power machine may be of generally known construction and is shown principally in dash-and-dot lines and indicated by reference character 30. The power machine has a lower shaft extension 31, which has an irregular recess 32 into which the upper end 33 of the tool 15 sets. At the upper end of the power machine is a projection 34 on which is a circumferential flange 35. The upper end of the projection 34 is pointed at 36.

The retaining and locking device attached to the bottom end of screw member 22 is made up of three parts, an outer part 37, an inner part 38, and a pin 39. The inner part, as shown in Figs. 2, 3 and 4, is a rectangular block which is drilled at each end with recesses or sockets 40 and 41. The recess or socket 40 is conically shaped at the bottom and is adapted to receive the lower end of the screw member 22 and is so deep that the groove 24 is inside this recess. The point 23 of member 22 has a smaller angle at the apex than the angle between the bottom sides of the recess 40 in order to obtain accurate alignment of parts 22 and 38 under working pressure. The recess or socket 41 is conically shaped at the top and is adapted to receive the upper projection 34 of the power machine. The apex angle of point 36 is less than the apex angle of recess 41 so that the parts 34 and 38 are held in accurate alignment under working pressure. The recesses and points are so aligned that there is a straight direct line of force through the parts 22, 38, 34 and tool 15. The inner member 38 is provided with a pin hole 42 so located that it is in alignment with the groove 24 when the bottom of screw member 22 is against the bottom of the recess 40.

The outer member 37 is a U-shaped piece. The U-shaped piece has holes 44 which are adapted to align with the hole 42. The pin 39 passes through the holes 42 and 44 and serves as a pivot for swinging the part 37 on the part 38. A cotter pin may be placed in hole 48 to hold the pin in place. The pin 39 may be secured to the part 38 as by a chain 49. The bottom part of the U-shaped member 37 is recessed as shown at 46. The bottom part of member 37 is also spaced from the bottom of member 38 when the parts are put together. This leaves a space which is adapted to receive the flange 35 of the power machine and keep it in place.

In assembling the parts, the inner member 38 is placed on screw member 22 so that the hole 42 is in juxtaposition to the groove 24. The outer member 37 is then placed over member 38 so that holes 44 are in alignment with hole 42 and groove 24. The pin 39 is then placed in the aligned holes and groove and it will be clear that the pin holds the parts 37 and 38 on the screw member 22 and serves as a pivot for part 37 to allow it to swing with an arc on part 38 thereby forming a locking device for holding members 34, 35 and 36 in position. These parts can remain assembled irrespective of application or removal of the power machine.

In applying the power machine, screw member 22 is elevated sufficiently to permit the power machine to be placed on the projection 33 of the tool. The part 37 is swung away from the part 38 and the part 33 is brought down onto the machine. When the projection 34 is well up in the recess 41, the part 37 can be swung into alignment with the part 38 and the flange 35 will be held between the parts 37 and 38. Thus the machine is locked in position. The screw 22 serves for feeding the machine down as the work progresses.

Slide 19 together with parts 20, 21, 22 and 23 can be lowered on slide bar 18 so as to use the apparatus without a power machine. In this case the parts 37, 38 and 39 can be removed from screw member 22, and the tool 15 can be rotated by hand, by means of a hand ratchet.

What I claim is:

1. In apparatus for tapping mains under pressure or the like with the aid of a power machine comprising a saddle, a slide bar mounted on said saddle, an adjustable holder slidable on said slide bar and a feed screw mounted on said holder, the combination therewith of a machine-retaining-and-locking device mounted on said feed screw comprising a member having end sockets, said member being formed with an aperture extending therethrough at right angles to, and communicating with one of said sockets, a pin adapted to be passed through said aperture, and a machine engaging element pivotally secured to said member for engaging and locking a part of a machine in the other socket.

2. In apparatus for tapping mains under pressure or the like with the aid of a power machine having a flange projection comprising a saddle, a slide bar mounted on said saddle, an adjustable holder slidably mounted on said slide bar and a feed screw mounted on said holder having a groove, the combination therewith of a machine-retaining-and-locking device comprising a member having aligned sockets at either end, said member being formed with an aperture extending therethrough at right angles to, and communicating with one of said sockets, a pin adapted to be passed through said aperture, and a machine engaging element pivotally mounted on said pin for engaging and locking a part of a machine in the other socket.

3. In apparatus for tapping mains under pressure or the like comprising a saddle, a slide bar mounted on said saddle, an adjustable holder slidable on said slide bar and a feed screw mounted on said holder, the combination therewith of a machine-retaining-and-locking device mounted on said feed screw comprising a member having aligned end sockets, said member being formed with an aperture extending therethrough at right angles to, and communicating with one of said sockets, a pin adapted to be passed through said aperture, and a U-shaped machine engaging element pivoted at its open end on said pin, the base of said U-shaped element being adapted to extend across the other end of said member in spaced relation therefrom for receiving and locking a part of a machine in the other recess.

FRED MICHAEL ROESCH.